United States Patent Office 3,175,798
Patented Mar. 30, 1965

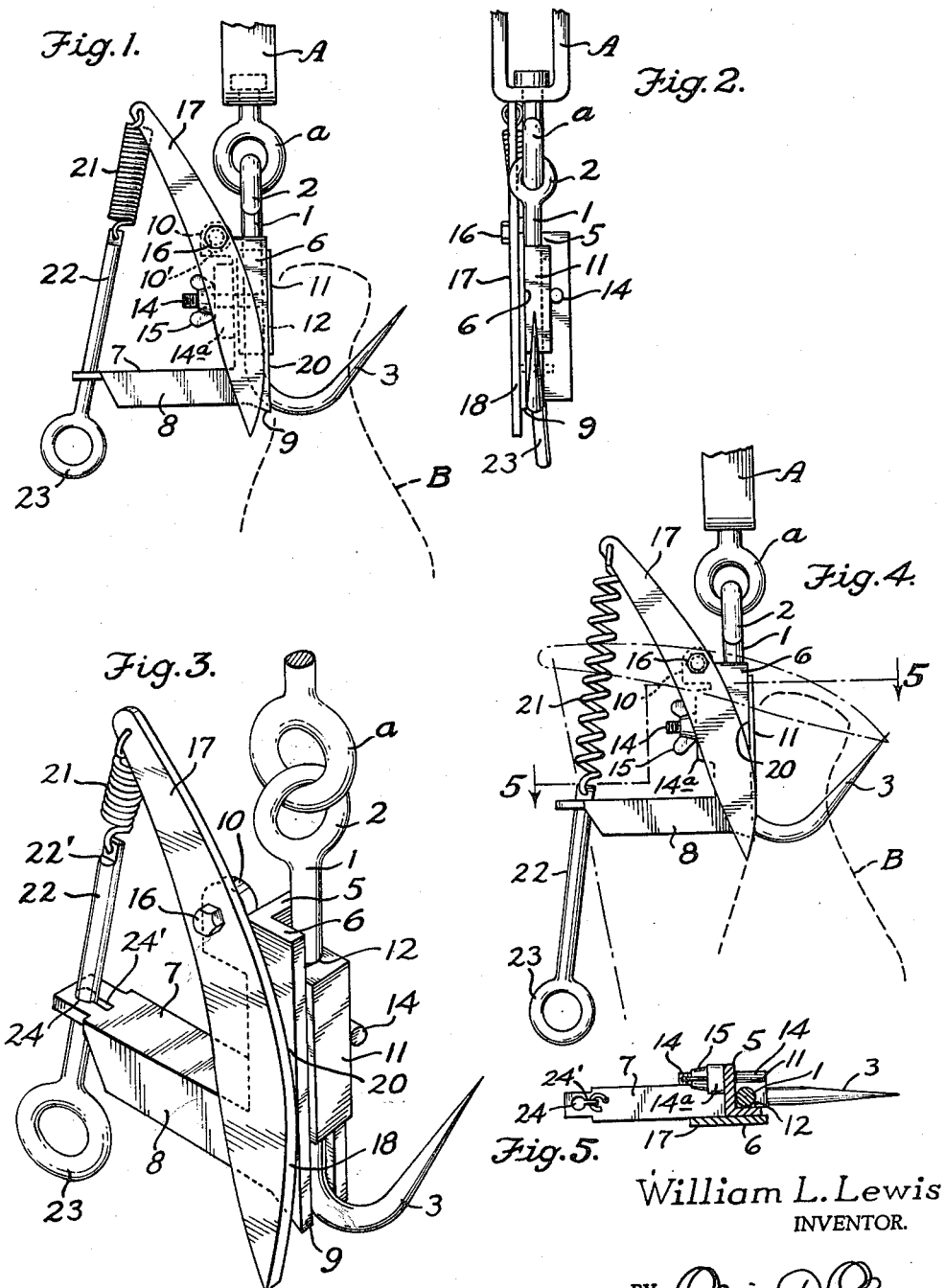

3,175,798
MEAT HOOK RELEASE
William L. Lewis, 1400 North Highway, St. Helens, Oreg.
Filed Feb. 3, 1964, Ser. No. 341,937
6 Claims. (Cl. 248—306)

This invention relates to a releasing attachment for conventional meat hooks and the general purpose is to facilitate the removal of the meat from the hook.

One of the objects of the invention is to provide a device of the character in question in which the assembly is so constructed as to be readily attachable to a conventional meat hook without modification of the hook structure.

Another object of the invention is to provide an attachment for a meat hook embodying an element which, when actuated, effects separation of the hook and the meat suspended thereon when the weight of meat is relieved from the hook.

It is a further object of this invention to provide a load-supporting hook including load-releasing means which is constructed in such manner that releasing pressure on the load may be applied only at the time of release, i.e. the load need not be subjected to releasing pressure during normal support on the hook.

More specifically the invention embodies an assembly wherein a bracket is associated with clamping means for securing the same to the shank of a meat hook, the bracket carrying a releasing lever, the lever being provided with a spring which may be biased to a position which will apply force to meat suspended on the hook, the direction of the force being such as to tend to remove the meat from the hook, whereby this operation may be performed without an excessive lifting effort and without dislodging or disarranging the hook with respect to its carrier.

Further objects of the invention will more clearly hereinafter appear by reference to the accompanying drawings and specification forming a part of this application, wherein like characters of reference designate corresponding parts throughout the several views, in which:

FIG. 1 is a side elevation showing the assembly before the hook releasing device is biased to operating position;

FIG. 2 is a front elevation of FIG. 1;

FIG. 3 is a perspective view of the assembly;

FIG. 4 is a side elevation showing the releasing device in its biased position and in its releasing position, the latter position being in dotted lines; and FIG. 5 is a transverse section taken on line 5—5 in FIG. 4.

In the disclosure, a portion of the standard trolley equipment for the suspension of meat in packing houses and similar storage facilities is indicated by reference character A, this portion of the trolley being provided with the usual swiveled eye *a* from which is suspended a meat hook, including a shank 1, as connecting eye 2, and a hook portion 3, the latter being suitably shaped for penetrating a portion of meat indicated at B, such as a hindquarter of beef, and for suspending same during its handling. The present device includes an angle bracket having a vertical portion defined by angularly arranged walls 5 and 6, and a horizontal portion defined by parts 7 and 8.

The lower corner of the bracket at the junction of the parts 6 and 8 extends downwardly as indicated at 9 to provide an increased bearing surface for one of the moving parts, i.e. the release lever to be hereinafter described. The outer face of the parts 6 and 8 and the projection 9 lie in a common plane to form a continuous flat bearing surface. Projecting from the upper portion of the rear face of vertical wall 5 is an ear or extension 10, this extension 10 lying with its outer wall flush with the outer face 20 of the wall 6 of the bracket assembly. The bracket is clamped to the shank 1 of the hook by a clamp block 11, this clamp block being provided with a longitudinal arcuate groove 12 for seating snugly against the shank portion 1 of the hook. The thickness of the clamp block 11 is substantially less than the width of the upright wall 5 of the vertical portion of the bracket and has attached to its outer face by welding or otherwise a bolt 14, this bolt 14 being threaded at its free extremity to receive a thumb nut 15. The vertical wall 5 of the bracket is provided medially of its length with a transverse perforation for receiving the free end of the bolt 14, whereby this bolt may be passed through the wall 5 and the thumb nut 15 forced into place against the boss 14ᵃ provided about the wall opening.

The horizontal wall 7 of the bracket is reduced as to its transverse diameter and is provided medially with a key slot 24, the reduced portion 24' of the key slot 24 extending longitudinally of the wall 7. The releasing lever 17 which is mounted on the pivot pin 16 is provided with an operating face 18 of general arcuate form to facilitate its movement with respect to the commodity on the hook with which it engages during both loading and unloading operation. The releasing lever 17 has its free end of such length as to project slightly beyond the free end of the hook 3, as best shown in FIG. 4, while the opposite end of the lever 17 is perforated to receive one end of a spring 21. The other end of the spring 21 is connected to the actuating rod 22, the latter being of a diameter to operate freely through the enlarged portion 24 of the key slot in the bracket arm 7 and terminating in a hand hold 23. The upper portion of the operating rod 22 is formed with lateral shoulders 22' which define the reduced adjacent extremity of the rod 22, the diameter of the latter being such as to pass through the reduced portion 24' of the key slot 24 to permit the shifting of the shoulders 22' beneath the walls defining the reduced slot 24'.

A suitable locking means, such as a nut, may be provided for the pivot pin 16 and a friction washer 10' will be arranged on the pin in engagement with the releasing lever 17 so that the latter will remain in a predetermined position when not under tension of the spring 21.

Although the device described hereinbefore may be utilized to advantage in supporting various types of loads, its function in supporting heavy sections of meat, as illustrated in the drawing and referred to hereinbefore, is a typical illustration of its utility. Accordingly, the following description of the operation of the device is also made with reference to the supporting of meat.

In the normal use of the hook for supporting heavy sections of meat, as in meat markets and meat storage plants, the section of meat B is supported upon hook 3 which is suspended from the trolley A. During normal storage of the meat the hook releasing mechanism is arranged in the position illustrated in FIGURE 1. In this position the lateral shoulders 22' are disengaged from the reduced portion 24' of the key slot 24 and the actuating rod 22 is extended upwardly through the key slot, and spring 21 is unloaded. In this position the weight of the lower section of releasing lever 17, i.e. the portion below the pivot pin 16, is greater than the weight of the upper section of the lever and the attached spring and actuating rod. Thus, the lower section of the lever functions to counterbalance the weight of the upper section and its attached elements and to position the lower section of the lever rearwardly of the hook shank 1. It will be apparent that in this manner no pressure is caused to be applied to the meat by the releasing lever during normal storage of the meat, thereby obviating all possible damage to the meat which might otherwise result from the continued application of releasing pressure thereto.

When it is desired to remove the meat B from the supporting hook, the attendant first grasps the hand hold 23 and pulls downwardly upon the rod 22 until the rod shoulders 22' are engaged in the reduced section 24' of the key slot. This operation extends the spring 21 to its loaded condition, as shown in full line in FIGURE 4. The elements remain in this position by virtue of the fact that the weight of meat is sufficient to resist the counterclockwise movement of the releasing lever 17 about its pivot.

The releasing mechanism is now in proper position for effecting release of the meat from the hook, as follows: The attendant lifts the meat upwardly, thereby reducing the downward force applied to the hook 3. With this reduction in force the coil spring 21 is capable of rotating the lever 17 in a counterclockwise direction, whereupon the meat engaging face 18 of the lever engages the meat adjacent the hook 3 and forces the meat forwardly over the end of the hook. With complete release of the meat from the hook, the lever 17 is rotated to the position illustrated in dot-and-dash line in FIGURE 4.

In the event it is desired to again use the hook for supporting a section of meat thereon, the attendant first releases the rod shoulders 22' from the key slot 24', permitting the counterweighted end 18 of the releasing lever to rotate downwardly to the position illustrated in FIGURE 1, with the spring 21 unloaded. As explained hereinbefore, the releasing lever 17 and the spring and actuating rod attached thereto remain in this position during normal storage of meat supported upon the hook.

From the foregoing description it is believed to be apparent that the present invention provides for the support of meat upon a hook and the release of said meat therefrom in most efficient manner. During storage of meat the releasing mechanism is in a normal untensioned state, whereby to prevent damage to the meat. The releasing mechanism is activated with speed and facility, however, when it is desired to remove the meat from the hook, and this operation is achieved merely by lifting the meat upwardly to remove sufficient weight from the hook to permit rotation of the spring-loaded releasing lever 17, whereby to instantly cause withdrawal of the hook from the meat.

The foregoing advantageous features of operation render the hook particularly suitable for use in supporting such loads as meat, although it will be apparent that the hook assembly may be utilized with equal advantage for supporting other loads which are capable of being attached to the hook by any suitable means, such as a rope, cable, clevis, etc.

It will be apparent to those skilled in the art that various modifications and changes in the details of construction described hereinbefore may be made without departing from the scope and spirit of this invention. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. In combination with a load supporting hook having a shank and a forwardly projecting hook, a bracket on the shank, a lever mounted pivotally on the bracket on an axis substantially normal to the plane of the hook, the lever having a load releasing end positioned adjacent the hook and movable toward the projecting end of the hook, normally unloaded resilient actuating means interconnecting the lever and bracket, a separate releasable member interconnecting the resilient actuating means and bracket for securing said resilient actuating means in loaded position, whereby to urge the load releasing end of the lever forwardly toward the projecting end of the hook into pressure contact with the load supported on the hook for disengaging the load and hook when the load weight is relieved from the hook, and means normally positioning the load releasing end of the lever rearwardly of the hook and out of substantial pressure contact with the load supported by the hook when the releasable interconnecting member is released and the resilient means is unloaded.

2. The combination of claim 1 wherein the means normally positioning the load releasing end of the lever rearwardly of the hook comprises the heavier weighted load releasing end of the lever.

3. In combination with a load supporting hook having a shank and a forwardly projecting hook, a bracket on the shank and having a rearwardly extending section, a lever mounted pivotally on the bracket on an axis substantially normal to the plane of the hook, the lever having a load releasing end positioned adjacent the hook and movable toward the projecting end of the hook, an actuating rod extending slidably through the rearward bracket section, a spring interconnecting the lever and actuating rod, and interengaging means on the rod and bracket section for releasably securing the spring in loaded position for disengaging the load and hook when the load weight is relieved from the hook, the load releasing end of the lever functioning to counterweight the lever normally to position said end rearwardly of the hook and out of substantial pressure contact with the load supported on the hook when the spring is unloaded.

4. In combination with a load supporting hook having a shank and a forwardly projecting hook, a bracket adapted to be removably secured to the shank, a lever mounted pivotally on the bracket on an axis substantially normal to the plane of the hook, the lever having a load releasing end positioned adjacent the hook and movable toward the projecting end of the hook, and normally unloaded resilient actuating means interconnecting the lever and bracket and arranged when unloaded to position the load releasing end of the lever rearwardly of the hook and out of substantial pressure contact with the load supported by the hook, a separate releasable member interconnecting the resilient actuating means and bracket for securing said resilient actuating means in loaded position, whereby to urge the load releasing end of the lever forwardly toward the projecting end of the hook into pressure contact with the load supported on the hook for disengaging the load and hook when the load weight is relieved from the hook.

5. In combination with a load supporting hook having a shank and a forwardly projecting hook, a bracket adapted to be removably secured to the shank and having a rearwardly extending section, a lever mounted pivotally on the bracket on an axis substantially normal to the plane of the hook, the lever having a load releasing end positioned adjacent the hook and movable toward the projecting end of the hook, an actuating rod extending slidably through the rearward bracket section, a spring interconnecting the lever and actuating rod, and interengaging means on the rod and bracket section for releasably securing the spring in loaded position for disengaging the load and hook when the load weight is relieved from the hook and for unloading the spring to normally position the load releasing end of the lever rearwardly of the hook and out of substantial pressure contact with the load when the latter is supported by the hook.

6. In combination with a load supporting hook having a shank and a forwardly projecting hook, a bracket adapted to be removably secured to the shank, a lever mounted pivotally on the bracket on an axis substantially normal to the plane of the hook, the lever having a load releasing end positioned adjacent the hook and movable toward the projecting end of the hook, normally unloaded resilient actuating means interconnecting the lever and bracket, a separate releasable member interconnecting the resilient actuating means and bracket for securing said resilient actuating means in loaded position, whereby to urge the load releasing end of the lever forwardly toward the projecting end of the hook into pressure contact with the load supported on the hook for disengaging the load and hook when the load weight is relieved from the hook, the load releasing end of the lever functioning to counterweight the lever normally to position said end rearwardly of the hook and out of substantial pressure contact with the load supported on the hook when the releasable interconnecting member is released and the resilient means is unloaded.

References Cited in the file of this patent

UNITED STATES PATENTS

| | | |
|---|---|---|
| 992,746 | Ashdown | May 23, 1911 |
| 1,370,589 | Johnson | Mar. 8, 1921 |
| 1,554,391 | Town | Sept. 22, 1925 |
| 2,037,320 | Fisher | Apr. 14, 1936 |
| 2,341,876 | Masterson | Feb. 15, 1944 |
| 3,046,598 | Daugherty | July 31, 1962 |